United States Patent [19]

Chuan-Yu

[11] Patent Number: 5,175,426
[45] Date of Patent: Dec. 29, 1992

[54] HIGH SPEED SINGLE-PASS SCANNING DEVICE FOR COLOR OPTICAL READER

[75] Inventor: Hsu Chuan-Yu, Hsinchu, Taiwan
[73] Assignee: Umax Data Systems Inc., Hsinchu, Taiwan
[21] Appl. No.: 703,747
[22] Filed: May 21, 1991
[51] Int. Cl.[5] .............................................. H01J 40/14
[52] U.S. Cl. .................... 250/208.1; 250/226
[58] Field of Search ............... 250/208.1, 226, 211 R; 358/213.26, 213.27, 473, 483, 497; 382/59, 65

[56] References Cited

U.S. PATENT DOCUMENTS 4,523,102  6/1985  Kazufumi et al. ............... 250/208.1
4,700,080  10/1987  Fukaya et al. ................... 250/208.1

*Primary Examiner*—David C. Nelms
*Assistant Examiner*—K. Shami
*Attorney, Agent, or Firm*—Shoemaker and Mattare, Ltd.

[57] ABSTRACT

A scanning device for a color optical reader suitable for high speed single-pass scanning and size reduction, comprising a color charge-coupled-device (CCD) to sense and output red, green and blue signals; a driving circuitry to control the magnitude of the output image signals from the CCD; a color separation circuitry to select the desired color signal; a color pixel arrangement circuitry to convert the color data from a line sequence to a pixel sequence and a positioning mechanism to drive the CCD sensor to a predetermined position.

The present invention can improve the effectiveness of single-pass scanning and output color signals while reducing the cost of the entire system.

4 Claims, 3 Drawing Sheets

| X1 | X2 | X3 | X4 | X5 | X6 | X7 |
|----|----|----|----|----|----|----|
| X8 | X9 | X10 | X11 | X12 | X13 | X14 |
| X15 | X16 | X17 | X18 | X19 | X20 | X21 |

ROW SEQUENCE    X1, X2, X3, X4, X5, X6, X7 ....

COLUMN SEQUENCE    X1, X8, X15, X2, X9, X16 ....

HIGH SPEED SINGLE-PASS SCANNING DEVICE FOR COLOR OPTICAL READER

BACKGROUND OF THE INVENTION

1. Field of the Invention

The present invention relates to a scanning device for a color optical reader, specifically, a high speed single-pass scanning device that can reduce the size of a color optical reader.

2. Brief Description of Prior Art

The scanning methods for a conventional color optical reader can be classified as follows:

1. A Single-Charge-Coupled-Device (CCD) 10 illuminated with multiple color light sources (usually red, green and blue light sources). As in FIG. 1, the light from light source 12 is reflected by mirror 13 to fall on CCD 10 through the lens 11.

2. A Single CCD 10 with a white light source 12 and filtered with multiple color filters, as in FIG. 2.

3. A Multiple CCD 10A, 10B, 10C with prism 10D illuminated by a white light source 12, as in FIG. 3.

4. A Color CCD 10 illuminated by a white light source 12, as in FIG. 4.

A conventional scanning device as in FIG. 1, because of its multiple light sources, it is quite large and not easily reduced in size. To complete the scanning process, the red, green and blue light sources must be turned on and off periodically. For most light sources, to obtain the intense and stable light needed for high quality color scanning, it requires the passage of a relatively long time and will thus reduce the scanning speed accordingly.

For the scanning device shown in FIG. 2 in which a color filter module 14 is set in front of the lens, the entire optical and mechanical structure becomes increasingly complicated and the size of this kind of scanning device will grow even larger. This kind of scanning device uses mechanical methods to periodically position the red, green and blue filters in front of the lens. Because mechanical operations have a slow response speed, we cannot achieve high speed color scanning.

The scanning device shown in FIG. 3 can obtain high speed color scanning because three CCD's 10A, 10B and 10C are used to simultaneously detect the red, green and blue light respectively. But the need for 3 CCD's makes this kind of device much more expensive than single CCD counterparts. The prism needed also makes the optical and mechanical design much more complicated.

As for the scanning device shown in FIG. 4, a color CCD is used so extra filters or a prism is not required, and a minimum size can be achieved. But because the color CCD simultaneously outputs red, green and blue signals, the cost of the image processing circuitry will increase considerably.

SUMMARY OF THE INVENTION

It is therefore an objective of the present invention to provide a high speed and low-cost scanning device for a color optical reader that enables high-speed color scanning.

It is a further objective of the present invention to provide a compact and low-cost scanning device for a color optical reader that permits the compact design of the color optical reader.

The present invention provides a scanning device suitable for high speed single-pass scanning and thus reduces the size of color optical reader. The scanning device consists of a color CCD to sense and output red, green, and blue signals, a driving circuitry to control the magnitude of the output signal from the CCD, color separation circuitry to select the desired color signal, a color pixel arrangement circuitry to convert the color data from a row or column line sequence to a pixel sequence, and a positioning mechanism PC to drive the CCD sensor to a predetermined position repeatedly till the entire page of scanning is finished.

The present invention first drives the color sensing means to a predetermined position by a positioning control means PC; then, it drives the color CCD three times by the driver means to send out red, green, and blue color signals which are successively separated from a desired single color signal in order by a color separation means. Finally, the three red, green and blue scanning signals are arranged from a line sequence to a pixel sequence by a color pixel arrangement means, so that the color scanning of one line is accomplished. After that, the scanning is continuously progressed, to drive the color sensor means to its next predetermined position, until all of the scanning procedure are completed.

DETAILED DESCRIPTION OF THE INVENTION

Figure 1:
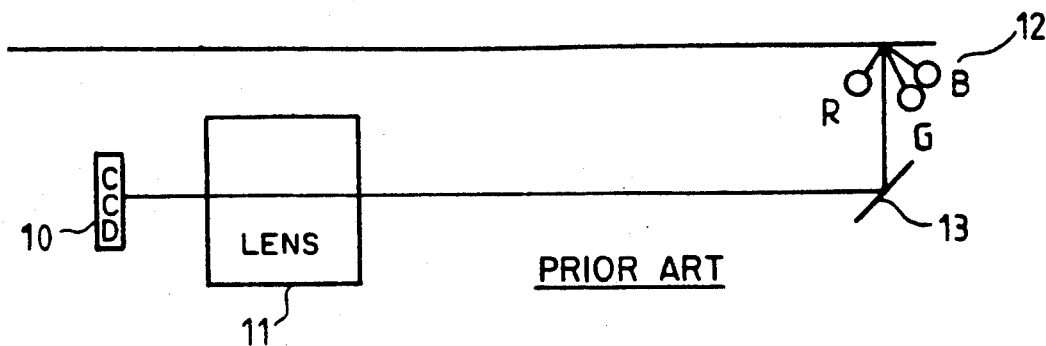
FIG. 1 to FIG. 4 show the conventionally used methods for a scanning device.
Figure 2:
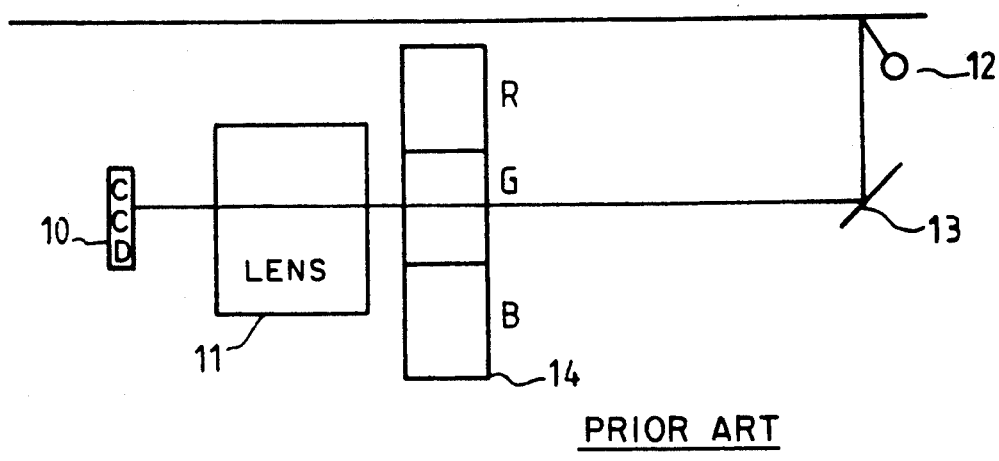
Figure 3:
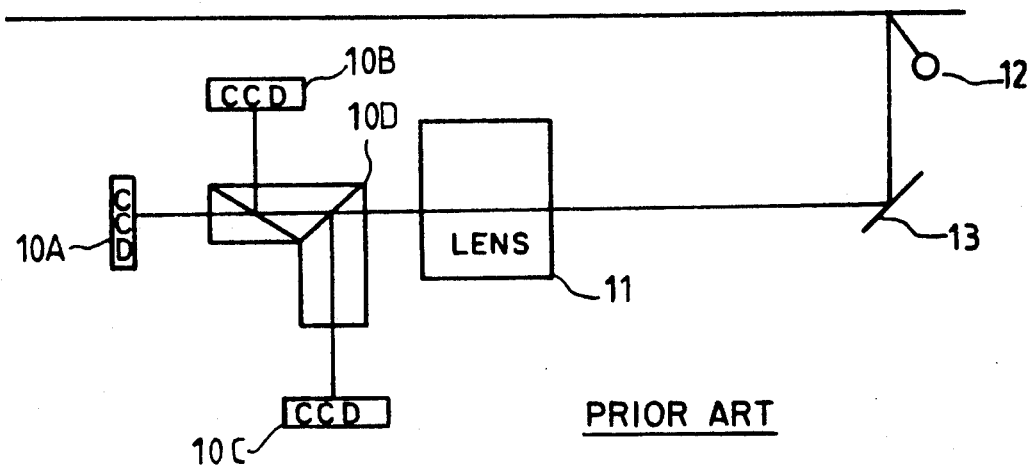
Figure 4:
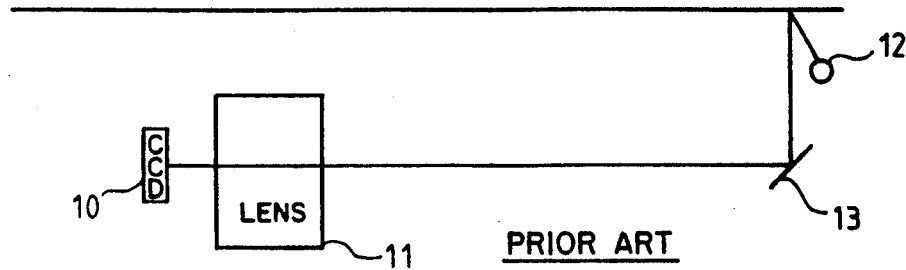
Figure 5:
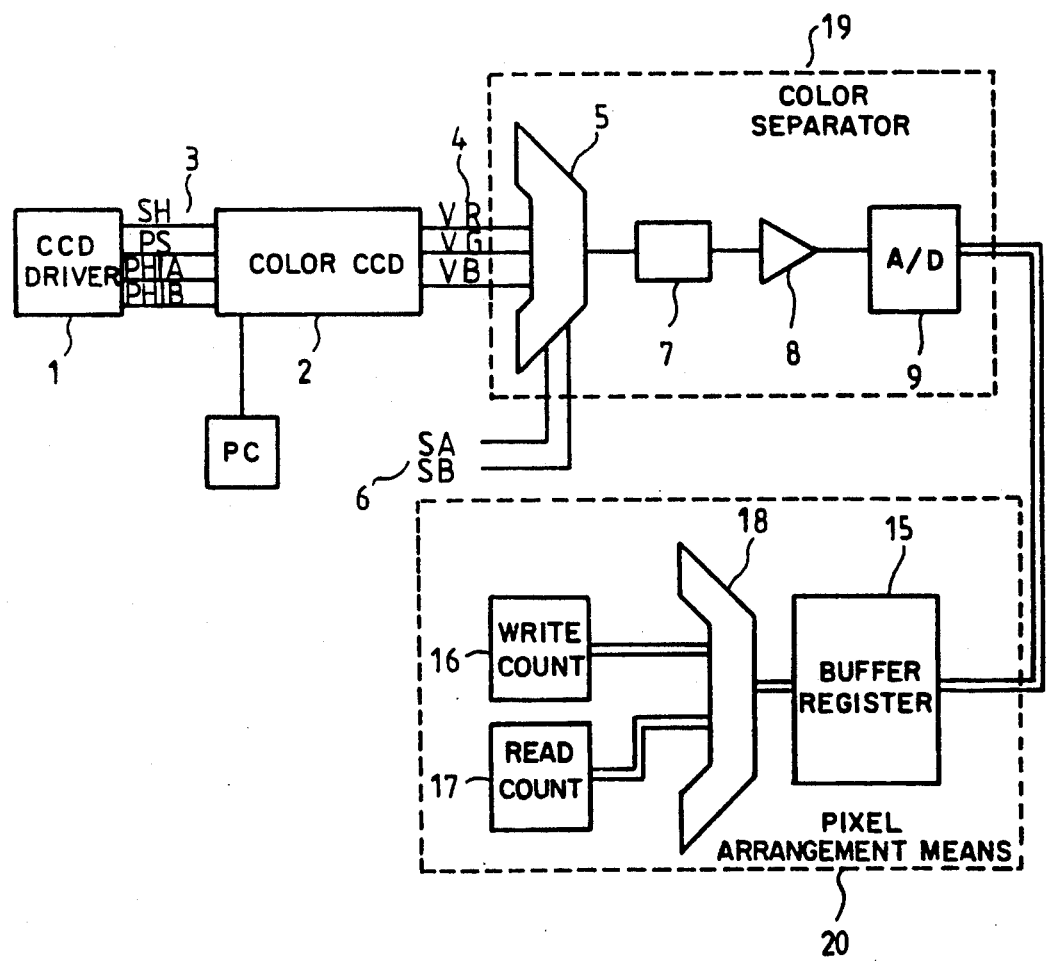
FIG. 5 is a schematic diagram showing a preferred embodiment of the present invention.

FIG. 5 shows a color scanning circuit for a color optical reader according to the present invention, comprising:

a color CCD driver (1);
a color CCD (2);
a color separator (19), including:
    an analog multiplexer means (5);
    a DC filter means (7);
    an amplifier means (8);
    an A/D converter means (9); and
a means of pixel arrangement (20), including:
    a buffer register means (15);
    an address multiplexer means (18);
    a writing counter means (16); and
    a reading counter means (17).

Figures 6, 7:
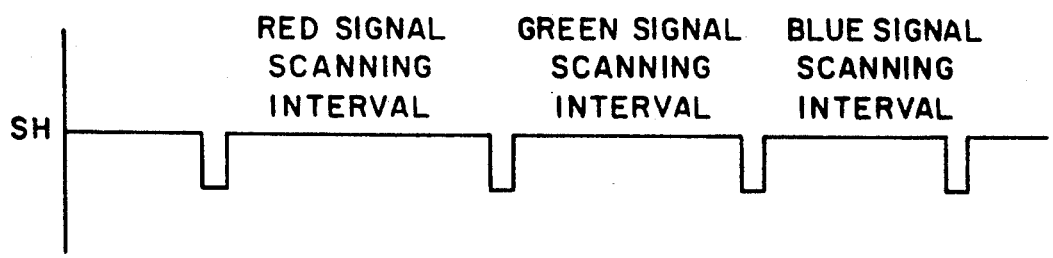
FIG. 6 is an example of the clock signal.
FIG. 7 is a diagram showing row sequence and column sequence.

CCD driver (1) generates CCD control signals (3) and color CCD (2) outputs red, green and blue video signals (4). FIG. 6 is an example showing a clock rate signal wherein the interval of clock rate signal SH is chosen to determine the exposure time of a color signal so as to control the magnitude of the output image signal. Color CCD (2) in FIG. 5 sends out red, green and blue image signals simultaneously. The analog multiplexer means (5) in FIG. 5 sends one of the proper color $V_R$, $V_G$, $V_B$ (4) signals to DC filter circuitry (7), by color selective signals SA, SB (6), to filter the DC portion from the image signal. After removing the DC portion, in order to reduce the interference of noise, the image signal is amplified by passing through an amplifier means (8). Then, the amplified image signal passes through an A/D converter (9) and is transferred to a deposit in a buffer register (15). The writing and reading addresses of buffer register (15) which are written in a row sequence and read in a column sequence by passing through an address multiplexer (18) to transfer the line sequence to a pixel sequence, is produced by writing counter (16) and reading counter (17) respectively. FIG. 7 is a diagram showing row sequence and column sequence.

The scanning operation of the color optical reader first selects one of the proper red, green, or blue video signals (4) with analog multiplexer (5), writing this signal into a buffer register (15), then, selects a second image signal and writes it into the said buffer register (15), and finally selects a third and last image signal and writes it into the said buffer register (15). After writing all 3 signals into said buffer register (15), the scanning device returns to the beginning scanning position of the next line to recommence scanning operations, until all of the lines have been scanned.

The following formula compares the scanning speed of single-pass scanning and three-pass scanning.

$$T_s = 3T_f + T_b$$

$$T_m = 3(T_f + T_b) \cdot T_m = T_s + 2T_b$$

where $T_s$ = single-pass scanning time
$T_m$ = three-pass scanning time
$T_f$ = single color forward scanning time
$T_b$ = homing time after a single color forward scanning.

From the above formula, it can be seen that single-pass scanning requires less scanning time and thus can achieve higher scanning speeds.

Because the color separation means of the invention is electrically adopted, it can obtain high speed color scanning by greatly increasing the speed of separating the color signals. Moreover, as it does not use any mechanically color separation devices, the size of the device can be optimally compacted.

The aforementioned is a description of an embodiment of the present invention. But the explanation of the embodiment is only an example of the present invention, and different styles of design from this example still belongs to the scope of the present invention. Therefore, the scope of the present invention should be decided by that which is claimed in the present invention.

What is claimed is:

1. A scanning device for a color optical reader, comprising:

color image sensor means including a color charge-coupled-device (CCD) (2) to sense and transfer color image signals to electrical analog image signals to output red, green and blue image signals simultaneously;

driver circuitry means including a CCD driver (1) to drive said color CCD and control the magnitude of the output image signals from said color CCD;

a color separation means (20) including:
   at least an analog multiplexer means (5, 6) to select one of the proper said red, green, and blue image signals;
   at least a DC filter (7) to remove the DC portion of the selected said image signal;
   at least a signal amplifier (8) to amplify said selected image signal;
   at least an A/D converter (9) to convert the selected analog image signal to digital image signal data;

a pixel arrangement means (20) including:
   at least a buffer register (15) having written therein in row line sequence said digital image signal data;
   at least a buffer register address multiplexer means (18) to generate writing and reading addresses respectively with writing in said row line sequence and reading in column line sequence;
   at least a writing counter (16) and a reading counter (17) accompanying said buffer register address multiplexer (18) to produce said writing and reading address, wherein the row line sequence is read in column line sequence to transfer line sequence to pixel sequence.

2. A scanning device as defined in claim 1, wherein said digital image signal data alternatively is written in said buffer register (15) in column line sequence, said buffer register address multiplexer generates writing and reading addresses with alternative writing in said column line sequence and alternative reading in row line sequence, and said writing counter (16) and said reading counter (17) respectively produce said writing and reading addresses, and wherein column line sequence is read in row line sequence to transfer line sequence to pixel sequence.

3. A scanning device as defined in claim 2, further including positioning control means to drive said color image sensor CCD means to predetermined positions repeatedly until the entire page of scanning is finished.

4. A scanning device as defined in claim 1, further including positioning control means to drive said color image sensor CCD means to predetermined positions repeatedly until the entire page of scanning is finished.

* * * * *